United States Patent [19]

Skawinski

[11] Patent Number: 4,978,900
[45] Date of Patent: Dec. 18, 1990

[54] DC SINE COSINE SERVO SYSTEM

[76] Inventor: Louis Skawinski, Amber Lakes, Long Pond, Pa. 18334

[21] Appl. No.: 315,607

[22] Filed: Feb. 27, 1989

[51] Int. Cl.$^5$ .................... G08C 19/00; H03M 1/64
[52] U.S. Cl. .................................... 318/560; 318/654; 318/661; 318/608; 341/115; 341/116; 340/870.25
[58] Field of Search .................... 318/652–661, 318/560, 632, 592–595, 608, 618; 340/870.25, 870.30, 870.34, 686, 670, 671, 672, 870.21; 341/112–117

[56] References Cited

U.S. PATENT DOCUMENTS

| | | | |
|---|---|---|---|
| 3,705,344 | 12/1972 | Espen | 318/654 |
| 4,023,085 | 5/1977 | Bishop et al. | 318/661 X |
| 4,310,790 | 1/1982 | Mulet-Marquis | 318/608 |
| 4,319,172 | 3/1982 | Sieradzki | 318/660 X |
| 4,328,483 | 5/1982 | Swartz et al. | 318/654 X |
| 4,352,050 | 9/1982 | Sakano | 341/115 X |
| 4,527,120 | 7/1985 | Kurosawa | 341/115 X |
| 4,529,922 | 7/1985 | Ono | 318/661 X |
| 4,594,540 | 6/1986 | Currie et al. | 318/661 |
| 4,631,523 | 12/1986 | Ono et al. | 341/116 |

Primary Examiner—William M. Shoop, Jr.
Assistant Examiner—Paul Ip
Attorney, Agent, or Firm—Anthony D. Cipollone

[57] ABSTRACT

A DC to DC sine/cosine positioning servo system has an electro-mechanical DC to AC converter. The latter includes a DC torquer, having a rotor with respective windings for receiving two DC input signals proportional to the error signals detected. Mechanial movement of the rotor is proportional to the relative values of the two input signals. The rotor of a synchro control transmitter is mechanically coupled to the rotor of the DC torquer. A reference oscillator is provided which produces an AC output voltage at a predetermined frequency. The oscillator output is connected to the rotor of the control transmitter. The stator windings of the control transmitter are connected to the stator windings of a control transformer. The rotor of the control transformer produces an output voltage directly proportional to the relative angle between the rotor of the control transformer and the stator windings. The output voltage of the rotor is compared to the output voltage of the reference oscillator in an AC to DC converter. The latter produces a DC output signal proportional to the control transformer rotor voltage and which drives a DC motor for positioning the system to a null. The system described can be used in a single speed servo system or in a fine and coarse, two speed servo system with appropriate gearing and signal sampling between the control transformers of each of the two systems.

2 Claims, 4 Drawing Sheets

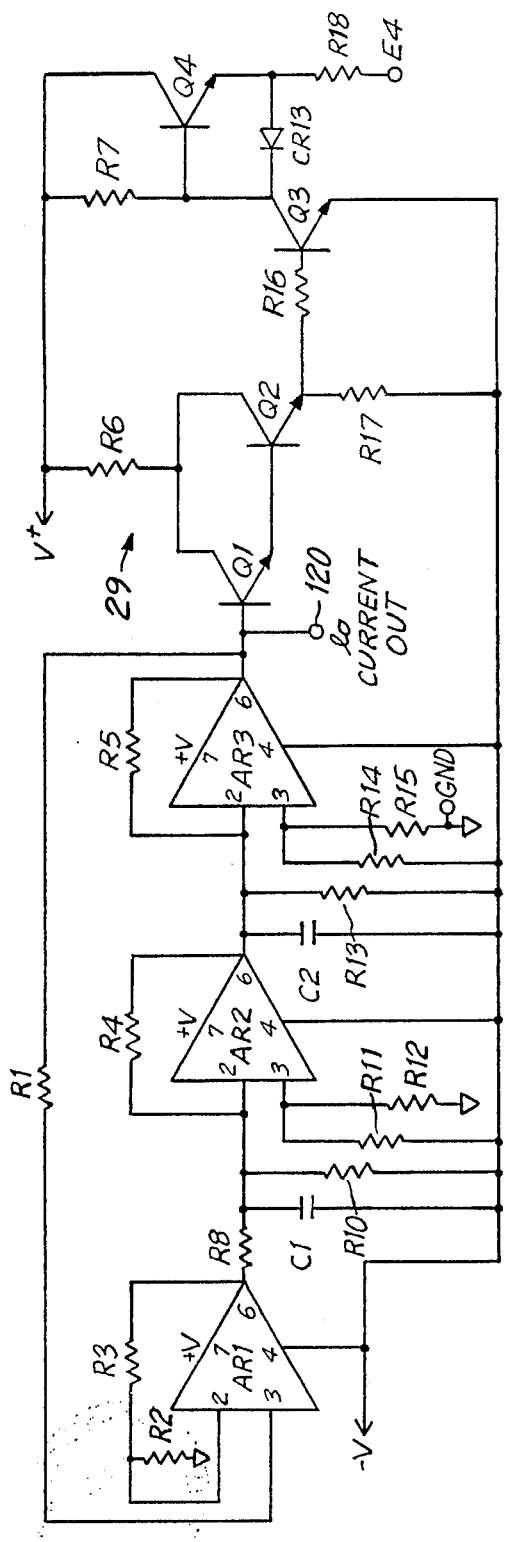
*FIG. 4*
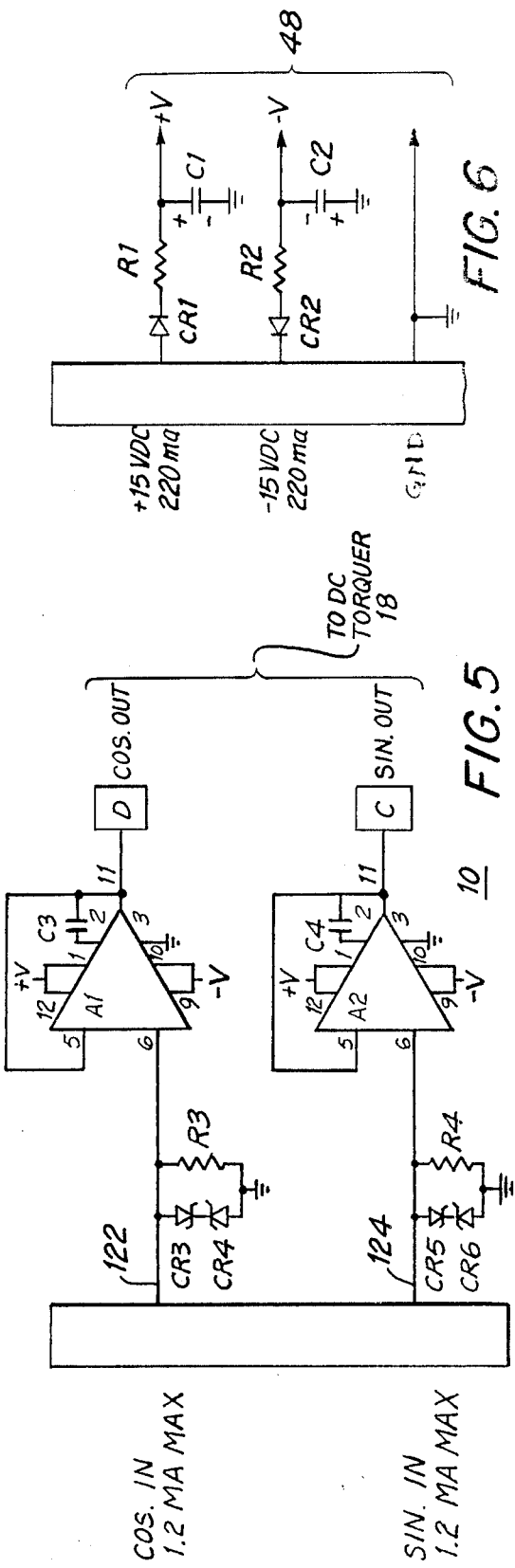
*FIG. 6*
*FIG. 5*

DC SINE COSINE SERVO SYSTEM

FIELD OF THE INVENTION

This invention, in general, relates to positional servo systems. In particular, it relates to an accurate dc positional servo system which eliminates the need to modulate the dc, system input signals, indicative of position or other quantity measured, and then subsequently demodulate same.

BACKGROUND OF THE INVENTION

Synchros and servosystems are error detection systems which play an important part in the operation of control systems having broad military and commercial application. These systems can be catalogued according to speed or accuracy as single or two-speed. The latter typically comprises a coarse system which is energized when the error is larger than a predetermined amount; and a so-called fine system which takes over when the error signal is small. The "single" servo system is typically only a coarse system for use in applications where accuracy is not paramount.

In the military, single speed systems include airborne instrumentation indicator units for such purposes as compass heading, radar altitude, mach air speed, roll-/pitch attitude, rate of climb, turbo speed (TACH) and engine temperature. Dual speed systems find use in altimeters where relatively, extreme accuracies are required, e.g., altimeters.

Heretofore, converters of DC to AC ARINC voltages involved first the modulation of the DC signals representing the sine and cosine of the angle being detected; then the resolving of the modulated signals followed by demodulating the resolved signals; and, finally the amplifying of the demodulated signals to a level sufficient to power a servo driver. This involved, by comparison to the herein disclosed design, relatively complex circuitry with approximately twice as many components.

Further, prior designs required each function in the process to be operated at the same frequency, normally the aircraft or vehicle operating frequency, necessitating synchronization. Interactive reactions between portions of the system are commonplace. These result in erratic performance and reduced accuracy, often in critical applications.

It is, therefore, a primary object of the present invention to provide a DC sine/cosine position servo system which utilizes approximately 50% less components over present systems.

It is another object of the invention in one embodiment, to provide a single speed, position servo system wherein the position error is reduced to ±15 minutes.

It is still another object of the present invention to provide a servo arrangement which can be employed as part of a two speed sine/cosine, attitude indicating, system wherein an error of ±5 feet in 100,000 feet can be obtained.

It is yet another object of the invention to provide a DC sine/cosine system where a different operational frequency can be employed, separate from the aircraft or system frequency, thereby eliminating detrimental, interactive effects.

SUMMARY OF THE INVENTION

Towards the accomplishment of these and other objects which will become more apparent after further reading, a DC to DC sine/ cosine positioning servo system is disclosed which has an electro-mechanical DC to AC converter. The latter includes a DC torquer, having a rotor with respective windings for receiving two DC input signals proportional to the error signals detected. Mechanical movement of the rotor is proportional to the relative values of the two input signals. The rotor of a synchro control transmitter is mechanically coupled to the rotor of the DC torquer. Reference oscillator means provides an AC output voltage at a predetermined frequency typically selected in the range between 400 HZ and 10 KHZ. The oscillator output is connected to the rotor of the control transmitter. The stator windings of the control transmitter are connected to the stator windings of a control transformer. The rotor of the control transformer produces an output voltage directly proportional to the relative angle between the rotor of the control transformer and the stator windings. The output voltage of the rotor is compared to the output voltage of the reference oscillator means in an AC to DC converter. The latter produces a DC output signal proportional to the control transformer rotor voltage and which drives a DC motor for positioning the system to a null.

The system described can be used in a single speed servo system or in a fine and coarse, two speed servo system with appropriate gearing and signal sampling between the control transformers of each of the two systems.

BRIEF DESCRIPTION OF THE DRAWINGS

A fuller understanding of the invention disclosed will be achieved after consideration of the following Description of the Preferred Embodiment as it relates to the accompanying drawings which include:

FIG. 4, which is an electrical schematic depicting a portion of the circuitry used in the systems of either FIG. 1 or FIG. 2.

FIG. 5 is an electrical schematic depicting the buffer, current amplifier circuitry in the front end of the systems depicted in FIGS. 1 and 2.

FIG. 6 is an electrical schematic of the system power supply.

DESCRIPTION OF THE PREFERRED EMBODIMENT

Figure 1:
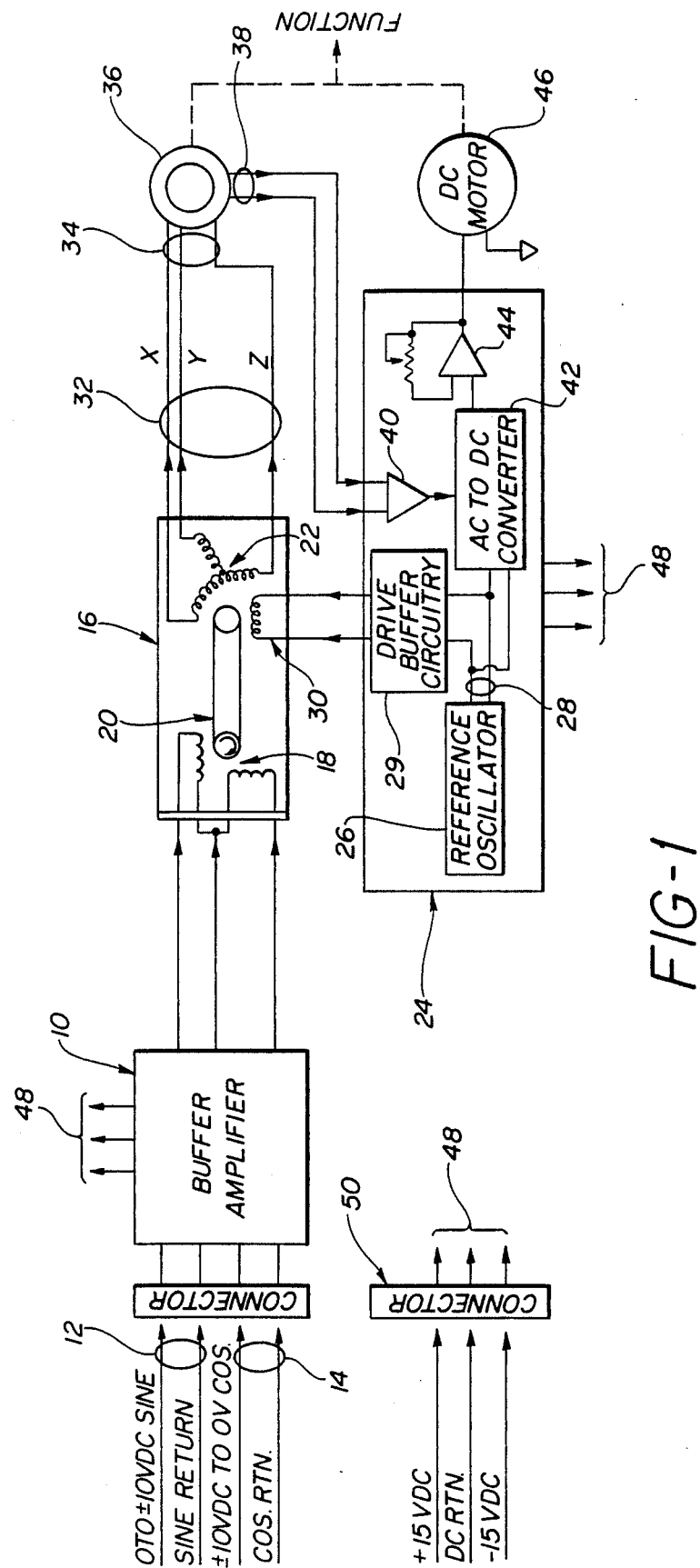
FIG. 1, which is a partial schematic and functional diagram of the unique design as used in a single speed, servo, system.

Referring to FIG. 1, a servo positioning system in accordance with the principles of the present invention is depicted. The system includes a buffer amplifier means, 10, which receive sine and cosine input signals on lines 12 and 14, respectively. The signals received typically span from −10 volts DC to +10 volts DC. They are proportional to the variation in the function which is to be measured and responded to by the particular servosystem, e.g. compass heading, vehicle altitude, etc.

Electrically connected to the output of the buffer amplifier means 10 are electromechanical means 16 for converting the amplified DC signals to AC ARINC voltages as commonly used in aircraft. This electromechanical means includes a DC torquer portion 18. The sine and cosine amplified signals from amplifier means 10 are electrically connected to respective windings on the torquer so that the angular positioning of the torquer shaft is a function of the relative, input signal levels. The shaft of the DC torquer is mechanically coupled to the shaft of a synchro control transmitter portion, 22.

The system includes additional circuit means 24, which includes reference oscillator means 26. This operates at a preselected frequency, typically in the range between 400 HZ and 10 KHZ. The output 28 from the oscillator means provides a drive signal through drive buffer circuitry 29 for the rotor winding 30 of the synchro transmitter means 22.

The stator windings 22 of the synchro transmitter means provide on their respective outputs AC electrical signals having an operating frequency of the reference oscillator 26 and a voltage magnitude proportional to the angle of the transmitter rotor as positioned by the DC torquer. The windings of the synchro transmitter are electrically connected to the stator windings 34 of a standard control transformer 36. In turn, the rotor winding 38 of the control transformer provides on its output a voltage proportional to the position of the rotor in relation to the angle represented by the stator voltages.

The voltage at winding 38 is then supplied to an amplifier portion 40 of additional circuit means 24. The output of the amplifier is supplied to one input of an AC to DC converter 42. The other input to the AC and DC converter is the reference voltage provided by reference oscillator means 26. The AC to DC converter produces an output DC signal which is amplified by amplifier means 44. The output of the amplifier means 44 in turn drives the winding of a suitable DC motor 46 whose shaft, through suitable mechanical means, functionally indicated by the dashed line, is connected to the rotor of the control transformer 36; and to the indicator or parameter sensing unit.

System, dc power 48 is provided to the buffer amplifier means, 10, and circuit means 24 by the system as typically provided through suitable connector means 50.

Figure 2:
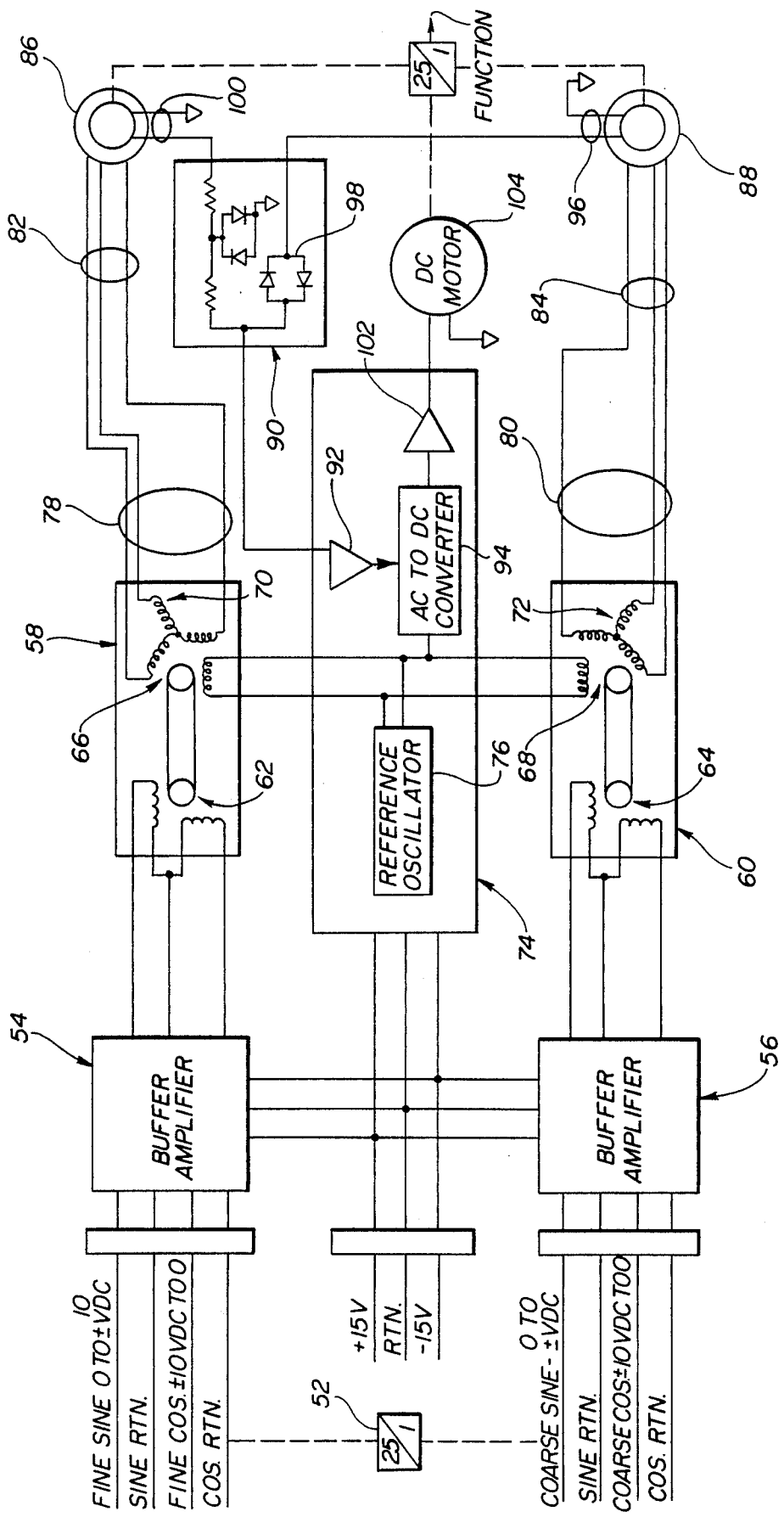
FIG. 2, which is a partial schematic and functional diagram of the unique design as used in a two speed, servo system.

FIG. 2 depicts a two-speed, fine and coarse, synchro system. As indicated, the ratio of the system speeds might typically be 25 to 1. This is effected, typically, by appropriate gearing between the fine and coarse system as indicated functionally at 52.

In this adaptation of the basic system described above, the fine and coarse systems each include appropriate buffer amplifier means, 54 and 56, to current amplify the signals received on their respective input lines. The current amplified signals are supplied to respective DC to AC converter means, 58 and 60. As before, the shafts of the dc torquers, 62 and 64, are mechanically coupled to the rotors 66 and 68 of corresponding synchro transmitters, 70 and 72.

Additional circuit means 74 includes again, a reference oscillator means 76. The output of the oscillator provides a drive signal for the rotors 66 and 68 of both the sine and cosine converters, 58 and 60.

The stator windings 78 and 80 are electrically connected to the stator windings 82 and 84 of respective control transformer means, 86 and 88.

Switching circuit means 90 are positioned between the outputs of the rotor of the fine control transformer and the rotor of the coarse control transformer. The switching circuit means 90 in effect gates the appropriate voltage which will drive amplifier means 92, which in turn is electrically connected to AC to DC converter means 94.

Switching circuit means 90 works as follows: when the error signal produced on the coarse signal rotor leads 96 is larger than the breakdown voltage of diode pair 98, the coarse signal controls and provides the input to the amplifier 92. When the system approaches its null point, the output of the coarse control transformer rotor drops below the breakdown voltage of the diode circuit pair 98. At this point the voltage appearing on the rotor leads 100 of the fine control transformer means 86 controls the input voltage to the amplifier 92.

The AC to DC converter circuit means 94 included in the additional circuit means, 74, through suitable amplifier means, 102, electrically drives DC motor 104. The motor in turn is mechanically coupled through suitable gearing mechanisms, shown functionally by the dashed line, to the rotors of the fine control transformer 86 and the coarse control transformer, 88, so as to drive them in the direction of system null. Suitable mechanical coupling also adjusts the indicator or sensing unit providing the input signal.

Figure 3:
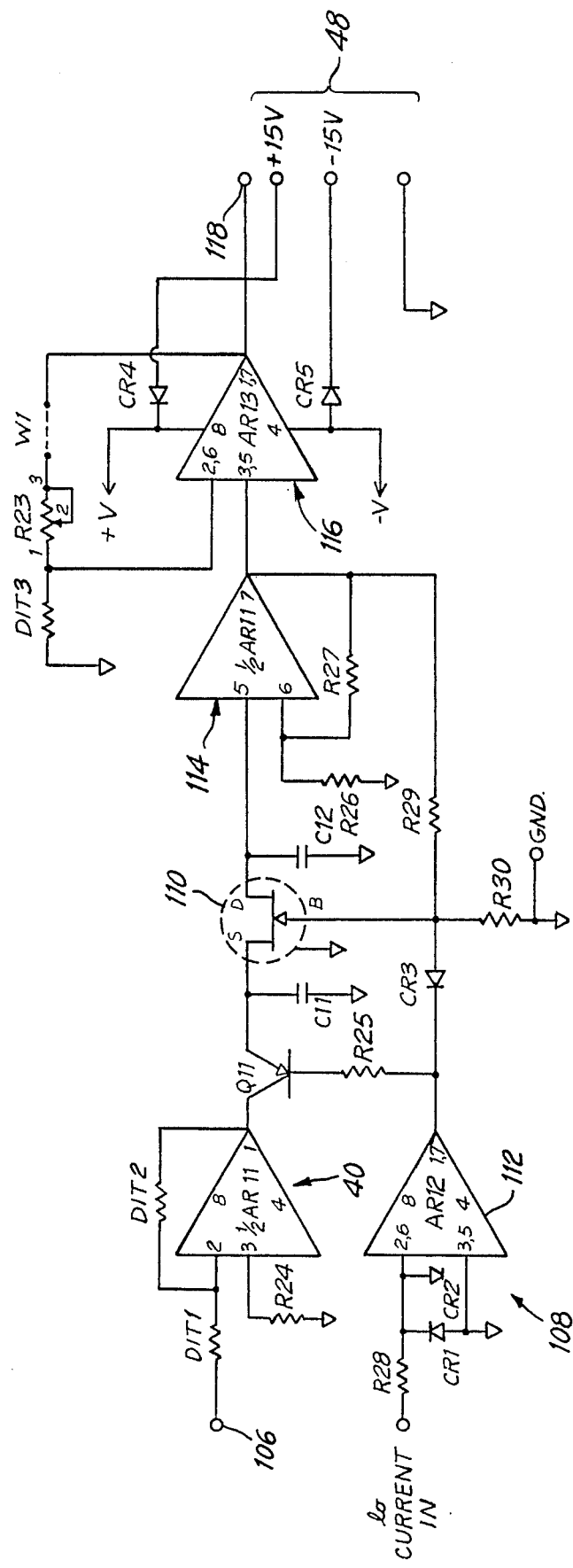
FIG. 3, which is an electrical schematic of the AC to DC converter portion of the system of either FIG. 1 or FIG. 2.

FIG. 3 depicts the AC to DC converter means, 42 or 94, of FIGS. 1 and 2. For purposes of the following discussion, corresponding references will be made to FIG. 1. Of course, it is to be understood that the discussion will have substantially identical application to the system of FIG. 2.

Included in FIG. 3 is amplifier means 40 for receiving the input signal either directly from the rotor of the control transformer means for the system of FIG. 1; or for receiving the signal from the switching circuit means 90 as depicted in the system of FIG. 2. Two resistors, DIT1 and DIT2, are determined at test to adjust the gain of amplifier means 40 to produce a desired dc voltage for a given ac signal at terminal 106.

Amplifier means 108 receives an input signal from the reference oscillator 26 and amplifies it and provides it to the base of transistor Q11 through resistor R25. The output of amplifier means 40 is supplied to the collector of transistor Q11. The emitter of the transistor Q11 is supplied to the source gate of field effect transistor 110. A capacitor C11 is connected from the source gate to electrical ground. The base of the field effect transistor 110 is connected through diode CR3 to the output of amplifier 112. The drain terminal of field effect transistor provides an input signal to amplifier 114. Capacitor C12 is positioned across the drain terminal of the field effect transistor to electrical ground. Feedback circuitry from the output of the amplifier 114 to its input is provided through resistors R27 and R26. Also, part of the output signal from amplifier 114 is fed back to the output of amplifier 112 through resistors R29 and R30 and diode CR3. As connected, the circuitry described provides a DC signal at the output terminal of amplifier 114 in proportion to the AC input signal received at input 106. The output from amplifier 114 is supplied in turn to the input of yet another amplifier 116. The output of amplifier 116 is adjusted through variable resistor R23, resistor DIT3, and selection of wire jumper W1 (or another resistor), all as determined in the testing procedure and peculiar to each particular application. The circuitry including the amplifiers 116, 40, 112 and 114 are powered in a known way through diodes CR4 and CR5, which are in turn connected to the system power 48. Referring back to FIG. 1, the output of amplifier 116 appearing on terminal 118 provides the drive signal for the DC motor 46 used in a particular system.

FIG. 4 depicts the reference oscillator means 26 and the drive buffer circuit means 29 of the additional circuit means 24 identified in FIG. 1. The reference oscillator means 26 includes amplifiers AR1, AR2 and AR3 interconnected with other circuit components in a positive feedback arrangement in a known fashion. Certain components are selected, particularly C1 and C2 and accompanying resistors, in a known fashion, to set the oscillator frequency, which typically is set in the range between 400 HZ and 10 KHZ.

Where the impedance (rotor winding(s) of the synchro transmitter(s)) to be driven by the oscillator is relatively high, a low current output, 120, is provided which is electrically connected to rotor winding 30. In cases where the impedance to be driven is comparatively low, a driver circuit such as 29, in FIG. 1 can be employed providing suitable power amplification to permit that application. In the latter case, referring to FIG. 4, transistors Q1, Q2, Q3, and Q4, are interconnected with suitable resistor components in a known fashion to provide a higher drive capability at output E4. In this latter application, the output at E4 would be used to drive the rotor winding e.g. 30 in FIG. 1, of the synchro transmitter.

FIG. 5 depicts circuitry included in the buffer amplifier means 10 of FIG. 1. The cosine error signal received at input 122 is supplied to amplifier A1 to produce at the output a current amplified signal which can then drive the input winding of the DC torquer 18. Diodes CR3 and CR4 protect the input 6 of A1 against excessive input voltage of either polarity.

Similarly, the circuitry associated with the sine input signal at terminal 124 provides a current amplified output signal for application to the corresponding winding of the DC torquer 18.

Referring to FIG. 6, the system power supply includes CR1, R1 and C1; and CR2, R2 and C2 which are connected to DC "raw" voltage supplies in the vehicle. Filtered voltages +V and −V, respectively, are supplied to the various circuits depicted in FIGS. 3, 4 and 5.

Parts lists for the various circuits depicted in FIGS. 3, 4, 5 and 6 follow hereafter.

| FIG. 3 | |
| --- | --- |
| Component | Part |
| AR11, 12, 13 | MC1558 |
| Q11 | 2N3910 |
| 110 | 2N4220 |
| C11, C12 | SR205C104K |
| CR4, CR5 | 1N645 |
| CR1, CR2, CR3 | 1N4454 |
| R23 | 3329H-1-105 |
| R24 | RCR05GF273J27K, ⅛W |
| R25 | RCR05223J22K, ⅛W |
| R26, R27 | RCR05154J150K, ⅛W |
| R28 | RCR05114J110K, ⅛W |
| R29, R30 | RC05473J47K, ⅛W |

| FIG. 4 | |
| --- | --- |
| Component | Part |
| AR1, AR2, AR3 | MC1741G |
| Q1, Q2 | 2N2222 |
| Q3, Q4 | 2N3767 |
| C1 | CK05BX221 (typical) |
| C2 | TA225K020P02 (typical) |
| CR13 | 1N645 |
| R1 | RC05102J1K, ⅛W |
| R2 | RC05511J510 |
| R3 | RC052R7J, ⅛W |
| R4 | RC05206J20Meg, ⅛W |
| R5 | RC05685J6.8Meg, ⅛W |
| R6 | RCR07392J3.9K, ⅛W |
| R7 | RC20102J |
| R8, 10, 11 & 12 | RC05105J1Meg, ⅛W |
| R13, 14, 15 | RC05334J, ⅛W |
| R16 | RC07223J |
| R17 | RC05222J2.2K |
| R18 | RC20220J |

| FIG. 5 | |
| --- | --- |
| Component | Part |
| A1, A2 | LH0041CG |
| CR3, CR4, CR5, CR6 | 1N972B |
| C3, C4 | SR205C104K |
| R3, R4 | RC05103J |

| FIG. 6 | |
| --- | --- |
| Component | Part |
| CR1, CR2 | 1N645 |
| R1, R2, C1, C2 | to be selected in a known fashion, based on circuit requirements |

As noted above, the individual circuits described have like application in the systems depicted in FIG. 1 or FIG. 2. E.g., buffer amplifier means, 10, would be identical for functions 54 and 56 of FIG. 2. So also, the circuit depicted in FIG. 3 and FIG. 4 would implement the function identified as 74 in FIG. 2.

While a preferred embodiment has been described, the breadth of the invention is not to be limited thereby. Rather, in view of the drawings and accompanying description, alternatives to the circuits and components listed may present themselves to those of skill in the art. Suffice it to say, the invention is not limited to the embodiment described, but rather is to be defined in terms of the claims which are set forth hereafter.

What is claimed is:

1. A DC to DC sine/cosine positioning servo system comprising:
   a. a first electro-mechanical DC to AC converter means including DC torquer means having a rotor with respective windings for receiving two DC input signals proportional to the error signal detected, whereby mechanical movement of the rotor is accomplished in direct proportion to the relative values of the two input signals; and, including synchro control transmitter means having a rotor mechanically coupled to the rotor of said DC torquer means and having a synchro control transmitter rotor winding and synchro control transmitter stator windings;
   b. reference oscillator means for producing an AC output voltage at a predetermined frequency;

c. means for electrically connecting the AC output voltage produced by said reference oscillator means to the synchro control transmitter rotor winding,
  said synchro control transmitter stator windings having a voltage produced thereacross proportional to the angular relationship between said synchro control transmitter rotor and said stator windings;
d. a first control transformer means, including stator windings and a rotor winding,
  said control transformer stator windings electrically connected to the stator windings of said synchro control transmitter means,
  said control transformer rotor winding having produced thereacross an AC voltage proportional to the angular position of the rotor of said control transformer in relation to the stator windings of said control transformer and proportional to the voltage appearing across the stator windings of said control transformer;
  electrically connected to the rotor winding of said control transformer means and second circuit means electrically connected to the output of said reference oscillator means,
  said AC to DC converter circuit means producing an output DC signal proportional to the AC signal appearing across the rotor winding of said control transformer means in relation to the AC output voltage of said reference oscillator means;
f. dc motor means responsive to the DC output signal produced by said AC to DC converter circuit means whereby said DC motor is rotated in response to said DC signal, said DC motor mechanically coupled to the rotor of said control transformer means and to the device producing the input signals whereby the control transformer rotor and said device are mechanically driven to a null position.

2. The system claimed in claim 1 further comprising:
a second, electro-mechanical DC to AC converter means including a second DC torquer means having a rotor with respective windings for receiving a second set of two DC input signals proportional to a second set of error signals, whereby mechanical movement of the second rotor is accomplished in direct proportion to the relative values of the second set of input signals; and
including a second synchro control transmitter means having a rotor mechanically coupled to the rotor of said second DC torquer means and having a second synchro control transmitter rotor winding and stator windings;
b. a second, control transformer means, including stator windings and a rotor winding,
  said second control transformer stator windings electrically connected to the stator windings of said second synchro control transmitter means,
  said second control transformer rotor winding having produced thereacross an AC voltage proportional to the angular position of the rotor of said second control transformer in relation to the stator windings thereof and proportional to the voltage appearing across the stator windings of said second control transformer;
c. and switching circuit means electrically connected to the rotor windings of said first and second control transformers, the output of said switching circuit means producing a voltage responsive to the voltage appearing across either the first control transformer rotor winding, or the second control transformer rotor winding, depending upon the magnitude of each, the first circuit means of said AC to DC converter means in claim 1 being electrically connected to the output of said switching circuit means;
  said AC to DC converter circuit means producing an output DC signal proportional to the AC signal appearing at the output of said switching circuit means in relation to the AC output voltage of said reference oscillator means;
  said DC motor means further mechanically coupled to the rotor of both said first and second control transformer means whereby said first and second control transformer rotors in addition to the device producing the input error signals are mechanically driven to a null position.

* * * * *